Dec. 3, 1957  H. VOLLMER  2,814,961
UPSETTING MACHINE FOR SAWS
Filed Nov. 9, 1955
2 Sheets-Sheet 1
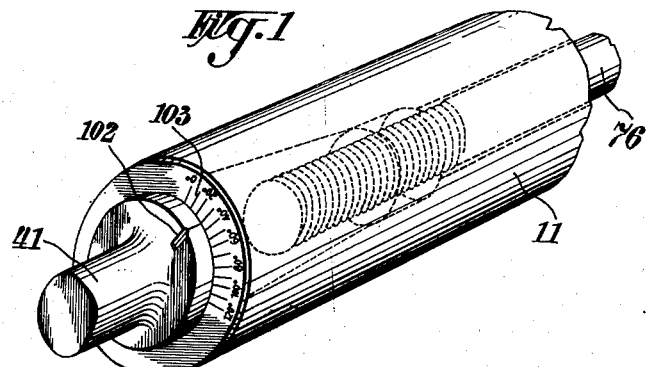
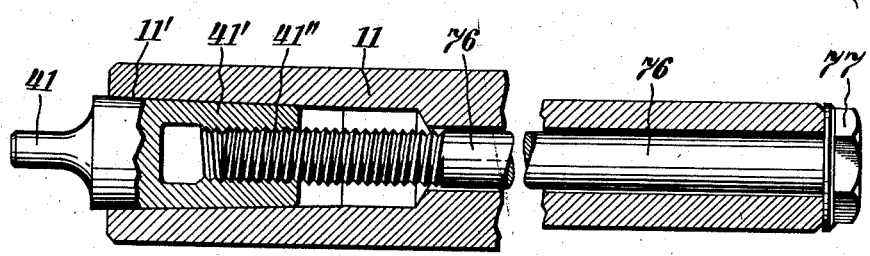
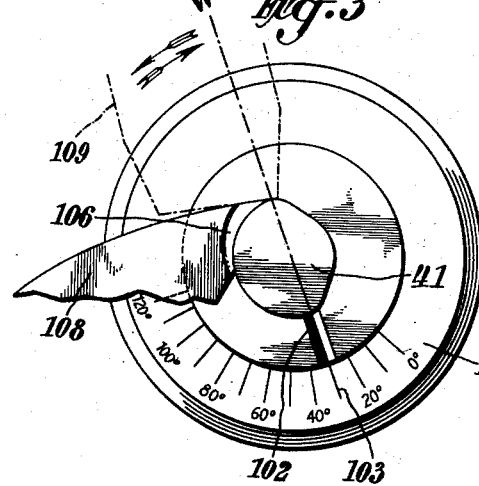
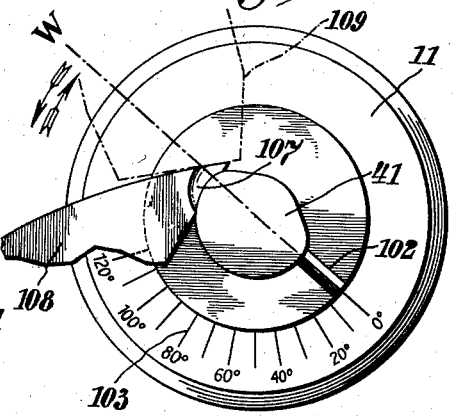
Inventor:
Heinrich VOLLMER Dec. 3, 1957   H. VOLLMER   2,814,961
UPSETTING MACHINE FOR SAWS
Filed Nov. 9, 1955   2 Sheets-Sheet 2

Inventor:
Heinrich VOLLMER
By

United States Patent Office 2,814,961
Patented Dec. 3, 1957

2,814,961
UPSETTING MACHINE FOR SAWS

Heinrich Vollmer, Biberach, Riss, Wurttemberg, Germany

Application November 9, 1955, Serial No. 545,945

8 Claims. (Cl. 76—54)

This invention relates to upsetting machines, and in particular to machine for upsetting saw teeth.

It is an object of the present invention to provide means facilitating upsetting of saw teeth in a greatly simplified and highly efficient manner, whereby one and the same tool may be employed in upsetting the teeth of a plurality of saws, though the latter are designed for different sawing operations.

Another object of the present invention is to provide means enabling adjustment of the initial angular position of an upsetting tool relative to the rest position of the saw teeth to be upset independently of the drive means for the tool, whereby upset saw tooth portions of varying magnitudes may be attained while the strokes of the tool remain constant.

Still another object of the present invention is to provide means contributing to an improved and highly efficacious upsetting machine wherein the tool may be readily connected to and removed from its holder for replacement, repair or adjustment without necessitating disturbance of the driving connections between said holder and the drive mechanism of said machine.

More particularly, this invention relates to an upsetting machine for saws which is provided with clamps or jaws to hold the saw during upsetting of the teeth thereof, an anvil for engaging the back of the saw tooth during the upsetting operation, a feed mechanism for advancing the teeth successively past the machine, and a rotatable upsetting tool which is also axially displaceable in regard to the tooth gullet of the saw tooth to be upset. The tool has at least a partially eccentric cross-section and is driven both during rotary and axial movements by the drive shaft of the machine.

It has long been a problem in this field to enable such machines to form different types of upset portions on saw teeth, depending on the use to which each particular saw was to be put. The characteristics of these upset portions are predetermined, for example, by the type of wood to be cut, by the physical state or condition of such wood, and by the manner of cutting or sawing. Heretofore suggested solutions for this problem have generally proved to be unsatisfactory and difficult to carry into practice.

It is, therefore, still a further object of the invention to provide means conducive to considerable improvements in or relating to upsetting machines and to the elimination of heretofore encountered difficulties for solving the aforesaid problem in a very efficient and economical manner.

These and other objects and advantages of the invention will become further apparent from the following detailed description, reference being made to the accompanying drawings, showing a preferred embodiment of the invention.

In the drawings:

Fig. 1 is a perspective view of the upsetting tool and its holder shaft in assembled relation according to the present invention;

Fig. 2 is a longitudinal sectional view of the tool and shaft of Fig. 1;

Fig. 3 is an enlarged front end view of the tool and shaft of Fig. 1 and illustrates adjustment of the tool for formation of a relatively long upset portion on a saw tooth;

Fig. 4 is a front end view similar to Fig. 3 and illustrates adjustment of the tool for formation of a relatively short upset portion on a saw tooth;

Figure 5:
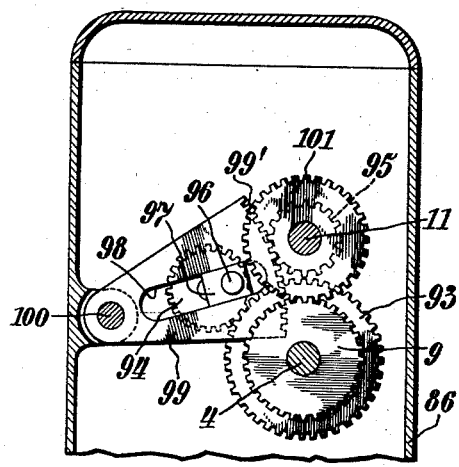
Fig. 5 is a sectional view through the upper portion of an upsetting machine not otherwise shown and illustrates the drive mechanism for the upsetting tool.

Referring now to the Figs. 1 to 4, the tool holder shaft 11, which is normally rotatably and reciprocatingly mounted in a housing 86 of the upsetting machine (see Figs. 5, 6 and 7), is provided at one end with a frustoconical axial bore 11' for receiving the foot or shaft 41' of an upsetting tool 41. The foot or shaft 41' is tapered toward its rear end so as to fit snugly into the bore 11'.

The rear end of the tool shaft 41' is provided with an internally threaded, axial bore or recess 41'' which cooperates with a threaded bolt or screw 76 extending through the holder shaft 11 from the rear end thereof. The bolt or screw 76 is provided at its outer end with a head 77. Thus, as the head 77 is turned in one direction, the threaded engagement between the screw 76 and the tool shaft or foot 41' causes the latter to be drawn into the bore 11' and firmly seated and accurately centered therein, while rotation of the screw in the other direction releases or loosens the tool.

In order to permit accurate initial adjustment of the tool 41 in the holder 11 prior to the start of an upsetting operation, an index mark or pointer 102 is provided on the tool shaft 41' which cooperates with a scale 103 provided on the front face of the holder shaft 11. This arrangement of the scale and index mark could, of course, be reversed if desired.

As indicated hereinabove, during the upsetting operation, the tool 41, which works only with its upper surface, is rotated back and forth through constant angle of 180° so as to upset each saw tooth to the same degree. It is for this reason that the tool 41 has an eccentric cross-sectional curvature for one half of its periphery and a semicircular cross-sectional curvature for the remaining half of its periphery.

The manner in which the upsetting tool 41 operates may be seen from Figs. 3 and 4. In Fig. 3 the tool has been adjusted initially to its 30° position, as seen on the scale 103, whereby the turning point W of the upsetting curve, i. e., the point at which the rotation of the tool 41 is reversed, is so arranged that a long upset portion 106 is formed on the saw tooth 108. When the tool is initially adjusted to its 0° position according to Fig. 4, a relatively short upset portion 107 is formed. The saw is normally backed up during the upsetting operation by an anvil 109.

Figure 6:
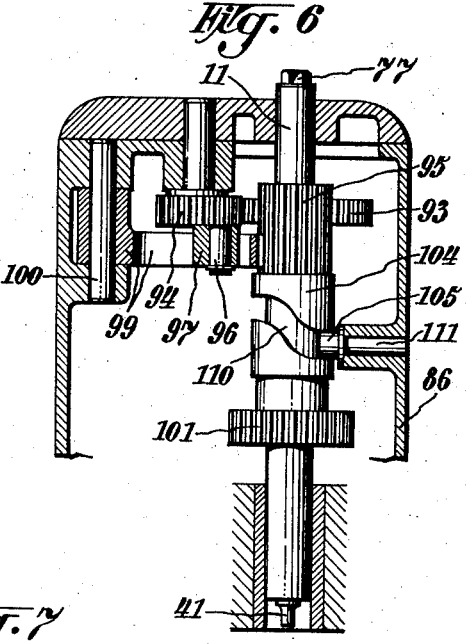
Fig. 6 is a sectional bottom plan view of the drive mechanism of Fig. 5.

Referring now to Figs. 5 and 6, the tool holder shaft 11 is rotatably and reciprocally mounted in the housing 86 of the upsetting machine. The axial reciprocatory movements of the holder shaft 11 are produced by means of a cam control drum 104 provided with a guide or cam groove 110 in which a roller 105 is engaged. The roller 105, which is fixedly supported in the housing 86 by an axle 111, is employed to reduce frictional resistance to rotation of the control drum 104 which is rotatably mounted on the shaft 11.

A gear 95 is fixedly mounted on the tool holder shaft 11 coaxially therewith. The control drum 104 is integral with a gear 101. The front face of the gear 101 abuts against a shoulder 112 on the shaft 11, and the rear end of the control drum 104 abuts against the front face of the gear 95, whereby the control drum 104 and the gear 101 are axially fixed on the shaft 11.

A gear 9, fixedly mounted on the main drive shaft 4 of the machine, meshes with and drives the gear 101. Also mounted on the main shaft 4 and spaced from the gear 9 is a gear 93, which drives a crank gear 94 rotatably supported in the housing 86. The gear 94 is provided with a crank pin 96 extending rotatably through a slide block 97. The block 97 is slidably engaged in an elongated guide slot 98 of a swinging or oscillating member 99.

The member 99, which is pivotally supported in the housing 86 by an axle 100, is provided with gear teeth 99' at its outer end and thus constitutes a gear segment. The teeth 99' mesh with the gear 95 fixed on the shaft 11. As may be seen from Fig. 6, the gear 95 is elongated and substantially cylindrical to ensure that even upon axial displacement of the shaft 11 the gear 95 is never disengaged from the gear segment 99.

The transmission ratio between the drive gear 93 and the crank gear 94 is preferably 2:1. Thus, during each complete rotation of the drive gear 93 the oscillating member 99 is swung up and down twice, once in the advanced or operative position of the tool holder shaft 11 during the performance of the upsetting operations on the saw teeth 108, and once in the retracted or inoperative position of the holder shaft during the no-load or idling rotation thereof. In general the pitches and tooth ratios of the gears are so chosen that each swinging movement of the member 99 in one direction corresponds to a rotation of the tool shaft of 180°.

Figure 7:
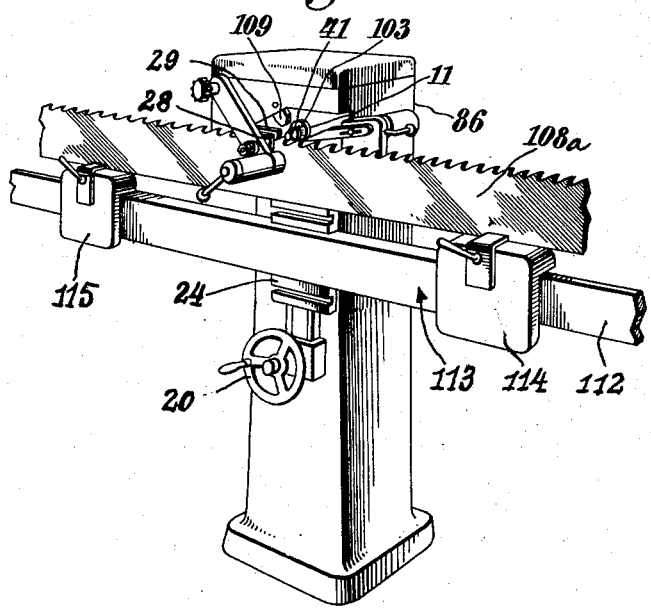
Fig. 7 is a perspective view of a machine tool with a saw blade and tool for application to the latter.

A machine with housing 86 is shown in perspective in Fig. 7. This machine has a vertically displaceable slide 24 which may be reciprocated by means of hand wheel 20 through a gearing or mechanism (not shown) enclosed in the machine housing 86. In slide 24 there is received a horizontal guide rail 112 along which are slidable for adjustment holder jaws 114 and 115 which serve the purpose of locating and securing in place saw blade 108a. The holder device 113 may be moved by means of slide 24 relative to the tool 41 as may be readily realized. During the upsetting operation of the teeth of the saw blade 108a clamping jaws 28, 29 compress the saw blade 108a, as it is well understood.

In operation of the machine, the tool shaft 11 is advanced by operation of the cam means 104—105—110 to position the tool 41 in a gullet of the saw, whereafter the upsetting of the saw tooth is accomplished by rotation of the tool 41 through an angle of 180° in a first direction by operation of the gear means 93—94—95—99. Subsequently, the tool is rotated in the reverse direction and then retracted with the shaft 11, whereby in the most retracted position of the latter the two reverse rotary motions of the tool shaft in its idling condition take place.

After retraction of the tool 41, the saw blade is advanced on the anvil 109 by suitable means (not shown) to bring another tooth opposite the tool 41. Thereafter the above operation is repeated until finally each tooth of the saw has been upset to the predetermined extent.

Having thus described the invention, what is claimed as new and desired to be secured by Letters Patent is:

1. In an upsetting machine for saws, said machine having a housing and means for supporting a saw adjacent said housing with at least one of the teeth of said saw in position to be upset; a holder shaft disposed within said housing for rotational and axially reciprocal movement, an upsetting tool supported by said holder shaft and rotatably adjustable about the axis of said shaft, means supported by said shaft and operatively connected to said tool for fixing the latter to said shaft in a predetermined angular position relative to said shaft, and a drive mechanism operatively connected to said shaft for alternately imparting to the latter both said rotational and said reciprocal movements, whereby said shaft with said tool may be moved axially from within said housing toward said saw tooth retained on said supporting means, thereafter rotated with said tool engaging said tooth to upset the latter, and then retracted from said tooth and into said housing, said angular position of said tool relative to said shaft determining the magnitude of the upset portion formed on said tooth.

2. In a machine according to claim 1, said shaft being provided with an axially extending frusto conical bore at one end, said bore converging toward the center of said shaft, said tool being provided with a tapered foot member receivable in said bore.

3. In a machine according to claim 2, said means for fixing said tool to said shaft comprising a screw extending through said shaft from the other end thereof and into said bore, said foot member being provided with an axial threaded recess receiving one end of said screw, whereby as the latter is rotated in one or the other direction said foot member will be drawn into or moved outwardly from said bore, respectively, said foot member and said bore constituting a releasable frusto conical joint between said shaft and said tool.

4. In a machine according to claim 1, said tool and said shaft being provided with cooperating means to indicate the angular position of said tool relative to said shaft.

5. In a machine according to claim 4, said shaft being provided with a scale, said tool carrying an index mark, said mark being moved past said scale as said tool is rotated relative to said shaft.

6. In a machine according to claim 1, the operative portion of said tool being partly circular and partly eccentric in cross-section with respect to said axis of said shaft.

7. In a machine according to claim 1, said drive mechanism including a drive shaft disposed in said housing, cam means operatively connected to said holder shaft, and gear means interconnecting said drive shaft with both said cam means and said holder shaft for actuating the same, said gear means being constructed to rotate said holder shaft with said tool upon engagement of the latter with said tooth through an angle of 180° in a predetermined direction and then in the reverse direction through the same angle prior to retraction of said tool from said tooth, said cam means being constructed to advance and retract said holder shaft with said tool toward and from said tooth, respectively.

8. In an upsetting machine for saws, said machine having a housing and means for supporting a saw adjacent said housing with at least one of the teeth of said saw in position to be upset; a holder shaft disposed within said housing for rotational and axially reciprocal movement, an upsetting tool supported by said holder shaft for rotational adjustment about the axis of said shaft, means supported by said shaft and operatively connected to said tool for fixing the latter to said shaft in a predetermined angular position relative to said shaft, a drive shaft rotatably supported in said housing, first and second gears fixed to said drive shaft and spaced from each other, a cylindrical gear fixed to said holder shaft, crank gear means interconnecting said second gear with said cylindrical gear and effecting rotation of the latter first in one direction and then in the reverse direction as said second gear rotates in one direction, a control drum disposed on said holder shaft and freely rotatable relative thereto, a third gear integral with said drum, said third gear meshing with said first gear, said control drum being provided with a cam groove, a roller supported by said housing and riding within said cam groove, and means on said holder shaft for restraining said control drum and said third gear against axial movement relative to said holder shaft, whereby through rotation of said control drum by said first and third gears in response to operation of said drive shaft said holder shaft is first moved toward said saw tooth held on said supporting means to enable said tool to contact said tooth and then away from said saw tooth, while, through said reversing rotation of said cylindrical gear in response to operation of said drive shaft with said second gear and said crank gear means, said holder shaft with said tool is rotated, subsequent to movement of said holder shaft toward and prior to movement of said holder shaft away from said saw tooth, first in one direction and then in the reverse direction to enable said tool while in contact with said saw tooth to upset the latter.

No references cited.